United States Patent Office.

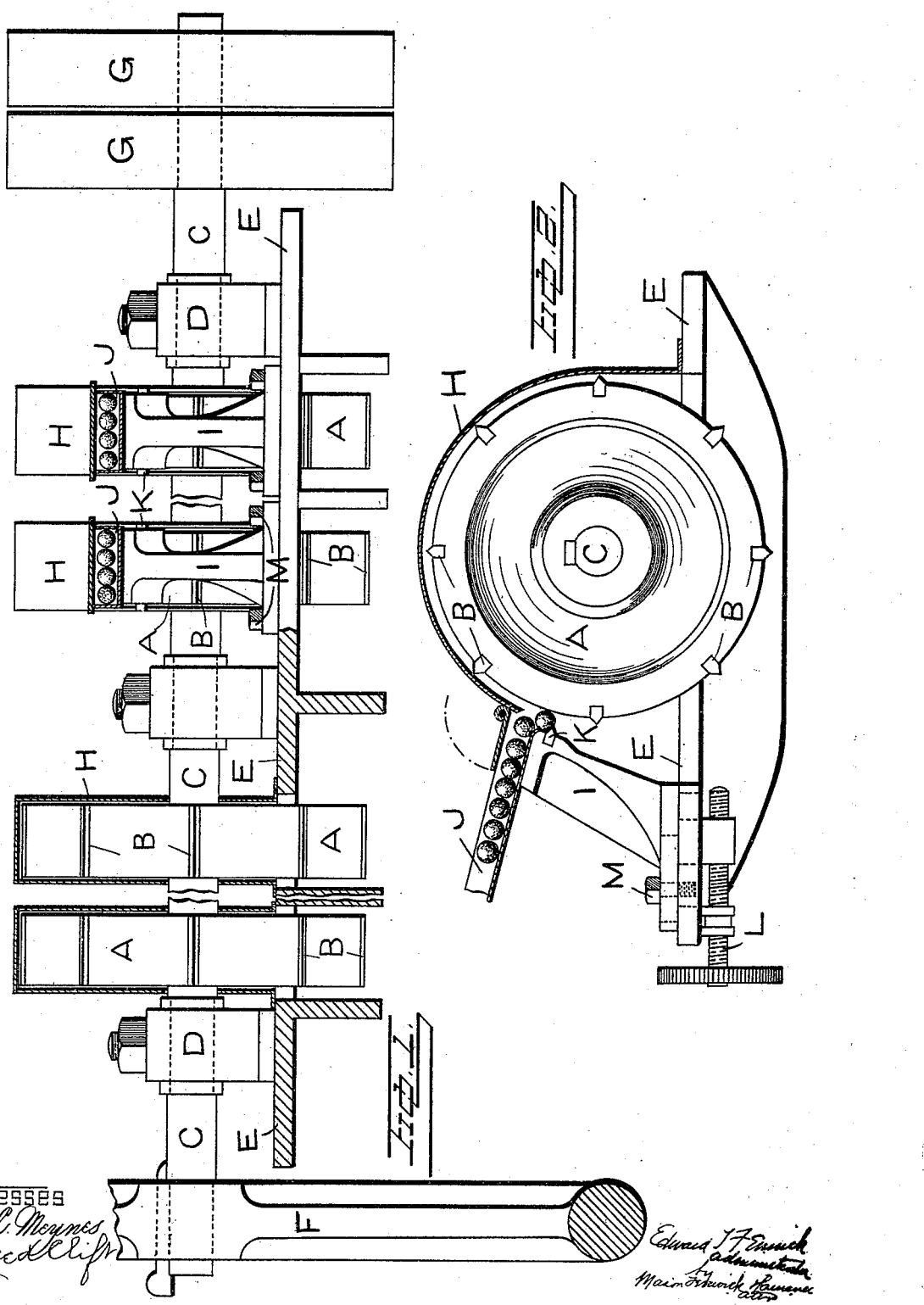

EDWARD T. FENWICK, OF WASHINGTON, DISTRICT OF COLUMBIA, ADMINISTRATOR OF HENRY CLAUGHTON, DECEASED.

MACHINE FOR CRACKING NUTS.

SPECIFICATION forming part of Letters Patent No. 632,216, dated August 29, 1899.

Application filed June 1, 1899. Serial No. 719,046. (No model.)

*To all whom it may concern:*

Be it known that I, EDWARD T. FENWICK, a citizen of the United States, and a resident of Washington, District of Columbia, administrator of the estate of HENRY CLAUGHTON, deceased, late a subject of the Queen of Great Britain, and a resident of Liverpool, in the county of Lancaster, England, do hereby declare that the following is such a full, clear, and exact description of the Improvements in Machines for Cracking Palm-Nuts, invented by the said HENRY CLAUGHTON during his life, as will enable others skilled in the art for which it is produced to make and use the same.

This invention has for its object a machine for cracking palm-nuts or nuts of a like description, so as to divide the outer shell and separate the kernel therefrom.

The invention will be understood from the following description, reference being had to the accompanying drawings, in which—

Figure 1 is a half front view of the machine with the casing removed and half-sectional elevation; Fig. 2, a cross-section.

Referring to the figures, A are cylinders or drums with steel bars or projections B on their peripheries acting as shearing-blades. The drums are mounted on a rotary shaft C, revolving in bearings D on a bed-plate E, said shaft being provided with a fly-wheel F. The shaft may be driven by pulleys G or any other suitable arrangement or be worked by hand. The drums A are partly inclosed in a frame or casing H, and there is a strong fence or barrier I, located adjacent to each disk, having a feeding-spout J, by which the nuts are fed against the periphery of each drum. The fences or barriers I are mounted on the frame E, and they have a steel projection or bars K extending just sufficiently far from the fence I toward the periphery of the drum A so as to hold the nuts and prevent them before being cracked from falling down between said projection and drum, while allowing the projections B on the drum to pass it. The projection K is a little below the top of the fence, so as to constitute a recess large enough to hold one nut at a time.

L is a screw working through a nut of the fence, whereby the latter can be adjusted nearer to and away from the cylinder and then locked by the pins M in position.

In action the uncracked nuts are fed into the feeding-spout J, the foremost nut dropping into the recess formed by the projection K, in which position it is in the path of the revolving ribbed periphery of the drum A. It is here acted on by the ribbed periphery of the drum, the teeth of which advancing toward the nut crack it and split open the shell, the kernel falling into a receptacle below as it parts with the broken pieces of the shell. The empty space will be at once refilled by the next nut in the feeding-spout, and so on in rotation, the projections on bars B on the peripheries of the drum acting upon the nuts in succession, the projection K affording a barrier as the nuts pass down the feeding-spout and insure each nut being cracked by the teeth B.

A riddle with mesh to divide the kernels from the broken outer shells and for sorting the nuts and a brush for cleaning the meshes may be provided, if required.

In the drawings are shown four separate drums arranged on a shaft. It is obvious, however, that any other suitable number may be employed.

The invention differs materially from cider-mills and apple-pulping mills in which apples are subjected to a pulping action, each apple being operated upon a number of times before being discharged or released. The invention is designed solely for cracking nuts, and the parts are so constructed and arranged that the nut upon being cracked will immediately fall through and another nut fall into place to be cracked.

What is claimed is—

A machine for cracking palm-nuts, comprising a rotary cylinder provided with projections or bars on its periphery, a fence or barrier arranged in proper proximity and relation thereto, a bar or projection on said fence or barrier which extends toward said cylinder and is arranged at such a distance below the upper edge of the barrier or fence as to constitute a recess capable of carrying a nut or a single row of nuts and allow the nuts to project above the upper edge of the barrier while being cracked and forming a check to the descent of the other nuts, a downwardly-inclined trough or hopper arranged at one side or end of the machine for feeding a single nut or single row of nuts to the machine to be cracked, the location and position of the bar or projection on the barrier or fence, with respect to the cylinder, being such that a nut or single row of nuts upon being cracked will fall through and another nut or row of nuts will fall into position to be cracked, substantially as described.

In testimony whereof I hereunto affix my signature in presence of two witnesses.

EDWARD T. FENWICK,
*Administrator of the estate of Henry Claughton, deceased.*

Witnesses:
T. REED CLIFT,
H. C. MEYNES.